Patented Jan. 10, 1933

1,893,966

UNITED STATES PATENT OFFICE

FRANK L. SHEW, OF ASHTABULA, OHIO

RUBBER PRODUCT AND METHOD FOR MAKING THE SAME

No Drawing.    Application filed September 16, 1929.    Serial No. 393,127.

This invention relates to products of rubber and to methods for producing the same.

As is well-known, considerable difficulty has heretofore been experienced in the art of producing rubber products to obtain rubber products and particularly those known as hard or semi-hard rubber products of pure white color. Rubber products have heretofore been made using white pigments for this purpose, but the processes by which they have been made have always as far as known resulted in rubber products of a cream or yellowish color.

The general purpose of the present invention is to provide rubber products of substantially pure white color and also to provide methods for the manufacture of such products.

The foregoing and other purposes of the invention are attained by the rubber products described and by carrying out the methods set forth below. It is to be understood, however, that the invention is not limited to the particular forms thereof as described and set forth.

It has been found that certain pigments when compounded in rubber mixes will produce rubber products which when vulcanized are capable of being treated to assume a white or substantially white color and that certain reagents which may be termed bleaching agents may be used on vulcanized rubber goods to change them from the creamy or yellowish color ordinarily produced to white. To manufacture the improved rubber goods in accordance with the improved method, it is merely necessary to incorporate such pigments in the rubber compounds as can be bleached subsequent to vulcanization and to utilize bleaching agents capable of bleaching the particular pigments used in the rubber.

In the succeeding paragraph one method of carrying out the invention is detailed, by way of example, and several formulæ which have been found to be successful in the production of white rubber are set forth in order that the practice of the invention will be better understood.

Titanium oxide or other compound of titanium such as titanium-calcium pigment, whose composition is approximately 30% of titanium oxide and 70% of calcium sulphate, or the compound of titanium oxide and barium sulphate, whose composition is approximately 25% of titanium oxide and 75% of barium sulphate, is incorporated with rubber in the usual manner on a mill or internal mixer, together with (1) a quantity of sulphur sufficient to produce a rubber of the desired degree of hardness when properly vulcanized; (2) either an organic or inorganic accelerator of vulcanization, and, in the case of organic accelerators that require the presence of zinc oxide or other metallic oxides for their activation, the necessary quantities of zinc oxide or such other metallic oxides as are necessary; (3) such quantities of stearic acid or other softener as may be necessary to give the proper consistency to the rubber mix for subsequent operations such as tubing, calendering, etc. A small quantity of ultramarine blue assists in producing clear shades of white. Examples of formulæ used are as follows:—

|  | Formula No. 1 | Formula No. 2 | Formula No. 3 |
|---|---|---|---|
| Pale crepe rubber | 20 | 21 | 36 |
| Titanium oxide | 55 |  |  |
| Titanium-calcium pigment |  | 48 | 39 |
| Zinc oxide | 3 | 3 | 3 |
| Magnesium oxide | 3 | 3 | 3 |
| Magnesium carbonate | 9½ | 10 | 5 |
| Stearic acid | ¾ | ¾ | ¼ |
| Ultramarine blue | ¼ | ¼ | ¼ |
| Lime |  | 6 |  |
| Mercaptobenzothiazole | ½ |  |  |
| Tetramethylthiuramdisulphide |  |  | ½ |
| Sulphur | 8 | 8 | 13 |
|  | 100 | 100 | 100 |

It should be understood, however, that these are not the only formulæ that may be used as the quantity of rubber and titanium compound may be varied as desired; nor is it necessary to use pale crepe rubber as other grades of rubber such as smoked sheets, fine Pará, etc., or a transparent reclaim may be used in place of part or all of the pale crepe.

The next step is to vulcanize the rubber compounds prepared according to formulæ such as the foregoing by subjecting them to heat sufficient to effect vulcanization to the extent that the vulcanized product is of the desired hardness. For the above formulæ fifteen to twenty-five minutes at a steam pressure of eighty-five to ninety pounds per square inch is sufficient to produce a hard rubber. The time of vulcanization should be as short as possible and the temperature of vulcanization should be as low as possible in order to secure best results. The resulting hard rubber may be buffed, rubbed, or polished to give the degree of gloss desired.

The third step is to treat the vulcanized product with a suitable bleaching reagent such as a solution of hypochlorous acid, chlorine water, or a solution of sodium or potassium hypochlorite. The preferred method is to treat the vulcanized product with a solution of hypochlorous acid by immersing it in the solution of hypochlorous acid for some time. By this treatment the surface of the vulcanized product is changed from a light yellow or cream color to a white, the shade of white depending upon the time of immersion in the solution and the quantity of the white pigment used in the formula. The time required to produce a good white surface depends upon the concentration of the solution, varying from one hour or less to twelve hours or more, for very dilute solutions. By this treatment it is possible to produce a hard rubber having a brilliant white surface.

It will be understood that other pigments and other bleaching reagents than those specifically mentioned may be employed without departing from the spirit of the invention or the scope of the appended claims.

What is claimed is:—

1. A white rubber product consisting of vulcanized rubber composition comprising white pigment, and having a surface bleach.

2. A white rubber product consisting of vulcanized rubber composition comprising a compound of titanium as a pigment, and having a surface bleach.

3. That method of making white rubber products which comprises incorporating a pigment in a rubber composition, which pigment is adapted to be bleached white subsequent to vulcanization of said composition, vulcanizing the composition and treating the vulcanized composition with a bleaching reagent.

4. That method of making white rubber products which comprises incorporating a pigment comprising a compound of titanium in a rubber composition, vulcanizing the composition and treating the vulcanized composition with a bleaching reagent.

FRANK L. SHEW.